US012737655B2

(12) United States Patent
Lam et al.

(10) Patent No.: US 12,737,655 B2
(45) Date of Patent: Sep. 15, 2026

(54) QUANTUM PROCESSING ELEMENT AND QUANTUM PROCESSING SYSTEM

(71) Applicant: Silicon Quantum Computing Pty Limited, Kensington (AU)

(72) Inventors: Hubert Lam, New South Wales (AU); Edyta Natalia Osika, New South Wales (AU); Benoit Patrick Francois Voisin, New South Wales (AU); Alexander Julien Kocsis, New South Wales (AU); Cassandra Joyce Chua, New South Wales (AU); Md Serajum Monir, New South Wales (AU); Rajib Rahman, New South Wales (AU); Sven Rogge, New South Wales (AU); Yu-Ling Hsueh, New South Wales (AU)

(73) Assignee: Silicon Quantum Computing Pty Limited, Kensington (AU)

( * ) Notice: Subject to any disclaimer, the term of this patent is extended or adjusted under 35 U.S.C. 154(b) by 434 days.

(21) Appl. No.: 18/550,121

(22) PCT Filed: Mar. 11, 2022

(86) PCT No.: PCT/AU2022/050208
§ 371 (c)(1),
(2) Date: Sep. 11, 2023

(87) PCT Pub. No.: WO2022/187908
PCT Pub. Date: Sep. 15, 2022

(65) Prior Publication Data

US 2024/0177041 A1 May 30, 2024

(30) Foreign Application Priority Data

Mar. 11, 2021 (AU) ................................ 2021900700

(51) Int. Cl.
*G06N 10/00* (2022.01)
*G06N 10/20* (2022.01)

(52) U.S. Cl.
CPC .................................... *G06N 10/20* (2022.01)

(58) Field of Classification Search
CPC ...................................................... G06N 10/20
See application file for complete search history.

(56) References Cited

U.S. PATENT DOCUMENTS

2013/0087766 A1 4/2013 Schenkel et al.
2016/0125311 A1* 5/2016 Fuechsle ................ H10N 69/00 257/31
2021/0082344 A1 3/2021 Hwang et al.

FOREIGN PATENT DOCUMENTS

WO WO2016187676 A1 12/2016

OTHER PUBLICATIONS

Geng, et al., "Coupling Two Distant Double Quantum Dots to a Microwave Resonator," Nano Letters, vol. 15, No. 10, 2015, 41 pgs.

(Continued)

*Primary Examiner* — Ajith Jacob
(74) *Attorney, Agent, or Firm* — Lee & Hayes, P.C.

(57) ABSTRACT

A quantum processing system and method of operating the same are disclosed. The system includes a first qubit comprising a first unpaired electron bound to a first pair of donor clusters embedded in a semiconductor substrate at a distance from the semiconductor surface, each donor cluster in the first pair of donor clusters including at least one donor atom. The system further includes a second qubit comprising a second unpaired electron bound to a second pair of donor clusters embedded in the semiconductor substrate at a distance from the semiconductor surface, each donor cluster in the second pair of donor clusters including at least one donor atom. In addition, a microwave resonator is located between the first qubit and the second qubit, wherein a first end of the (Continued)

microwave resonator is coupled to the first qubit and a second end of the microwave resonator is coupled to the second qubit. A photon of the microwave resonator couples the first qubit and the second qubit.

20 Claims, 9 Drawing Sheets

(56) References Cited

OTHER PUBLICATIONS

Harvey-Collard, et al., "All-Electrical Universal Control of a Double Quantum Dot Qubit in Silicon MOS," 2017 IEEE International Electron Devices Meeting, 2017, 4 pgs.

PCT Search Report & Written Opinion for Application No. PCT/AU2022/050208, mailed on May 12, 2022, 9 pgs.

Kane, B.E., "A Silicon-Based Nuclear Spin Quantum Computer," Nature, vol. 393, 1998, pp. 133-137.

Morello, et al., "Donor Spins in Silicon for Quantum Technologies," Advanced Quantum Technologies, vol. 3, No. 11, 2020, 17 pgs.

Nichol, et al., "High-Fidelity Entangling Gate for Double-Quantum-Dot Spin Qubits," npj Quantum Information, vol. 3, No. 1, 2017, 5 pgs.

Tosi, et al., "Silicon Quantum Processor With Robust Long-Distance Qubit Couplings," Nature Communications, vol. 8, 2017, 11 pgs.

Benito M. et al.: "Hybrid superconductor-semiconductor systems for quantum technology", Applied Physics Letters, vol. 116, No. 19, Apr. 30, 2020 (Apr. 30, 2020), XP093234567, 2 Huntington Quadrangle, Melville, NY 11747, ISSN: 0003-6951, DOI: 10.1063/5.0004777, Retrieved from the Internet: URL:https://arxiv.org/pdf/2005.00030.

EP 22765999.2, Partial Supplementary Search Report, Mailed Jan. 15, 2025, by the European Patent Office, 16 pages.

EP 22765999.2, Partial Supplementary Search Report, Mailed Septebmer 5, 2025, by the European Patent Office, 16 pages.

Gorman Samuel: "Charge and spin dynamics in multi-donor systems", Doctor of Philosophy, Feb. 1, 2021 (Feb. 1, 2021), XP093233728, DOI: 10.26190/unsworks/3622, Retrieved from the Internet: URL:https://unsworks.unsw.edu.au/entities/publication/ 5999a4c9-4ec3-40f4-aa1b-8970ffebe9f1.

* cited by examiner

QUANTUM PROCESSING ELEMENT AND QUANTUM PROCESSING SYSTEM

This Application is a U.S. National Stage application of PCT/AU2022/050208, filed Mar. 11, 2022, which claims priority to Australia application 2021900700, filed Mar. 11, 2021, which is incorporated herein by reference.

TECHNICAL FIELD

Aspects of the present disclosure are related to quantum processing systems and more particularly to semiconductor-based quantum processing systems and quantum processing elements.

BACKGROUND

Universal quantum computing is a potentially revolutionary technology that could be applied in certain domains to solve problems that are intractable when running the currently known best classical algorithms on state-of-the-art classical computers. Examples of domains in which universal quantum computers are known to provide an advantage include classes of optimization problems: advanced chemistry simulations; and finding prime factors of large numbers, which would defeat the most common classical encryption protocols. For some of these applications, such as finding prime factors of large numbers, quantum computers should be exponentially faster than their classical counterparts. Quantum computing may also be useful in certain machine learning applications.

One such universal quantum computer architecture utilizes quantum bits (or qubits) encoded in the spin of an electron localized in a semiconductor substrate (such as silicon), either electrostatically with a gate, or using the natural confinement of a donor atom hosted in the crystal lattice. Qubits implemented in silicon can leverage some of the mature technology used to fabricate conventional silicon transistors and integrated circuits. It is believed that a useful, universal quantum computer will comprise hundreds of error-corrected qubits, with the critical ability to implement two-qubit operations between a number of these qubits.

Semiconductor spin qubits have now reached high enough figures of merit to envision error-corrected architectures for quantum information processing, but several outstanding challenges remain to be solved before a viable quantum computing processor can be demonstrated in silicon. One such challenge relates to the placement of quantum dots/donors on a processor chip. It is known that exchange interactions between qubits decay exponentially with quantum dot/donor separation, meaning that the quantum dots/donors need to be closely and precisely placed, tens to hundreds of nanometres apart. In such a two-dimensional qubit array, it becomes extremely difficult to include gates, necessary for control and readout, to quantum dots/donors in the centre of the array. Furthermore, such a dense packing of quantum dots/donors and control electronics implies a rate of heat dissipation that is currently incompatible with the cryogenic temperatures necessary for qubit coherence.

One option to overcome such issues is to include multiple qubits or nodes in a quantum computing processor where each node includes a limited number of quantum dots/donors and their associated circuitry. The nodes may be connected to each other, alleviating overall density while still allowing quantum computation to be performed. To do this, the outer edge qubits of one node will need to be coupled with the corresponding outer edge qubits of another node. A leading technique for coupling the edge qubits across nodes is via superconducting microwave resonators and spin-photon coupling.

However, direct spin-photon coupling between an electron spin and a microwave photon, is inherently challenging due to the small magnetic dipole interaction, of the order of 100 Hz, between the electron spin and microwave photon. Instead, the coupling between the photon and the spin can be enhanced by implementing a so-called spin-orbit coupling between the spin and a charge degree of freedom of the qubit, the latter coupling electrically to the photon. However, up to now, micro-magnets or nano-magnets have been fabricated on chip in order to achieve spin-orbit coupling, but this is a complex fabrication process that poses new challenges when scaling up to hundreds of qubits.

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

SUMMARY

According to a first aspect of the present disclosure there is provided a quantum processing system comprising: a first qubit comprising a first unpaired electron bound to a first pair of donor clusters embedded in a semiconductor substrate at a distance from the semiconductor surface, each donor cluster in the first pair of donor clusters including at least one donor atom; a second qubit comprising a second unpaired electron bound to a second pair of donor clusters embedded in the semiconductor substrate at a distance from the semiconductor surface, each donor cluster in the second pair of donor clusters including at least one donor atom; and a microwave resonator located between the first qubit and the second qubit, wherein a first end of the microwave resonator is coupled to the first qubit and a second end of the microwave resonator is coupled to the second qubit: wherein a photon of the microwave resonator couples the first qubit and the second qubit.

In one embodiment, the donor clusters in the first pair of donor clusters and the second pair of donor clusters are separated such that a tunnelling frequency of the unpaired electron is close to a resonance frequency of the microwave resonator.

In some embodiments, the quantum processing system further includes first and second electrically-conductive leads fabricated within the semiconductor substrate in proximity to each of the first and second qubits. The first and second electrically conductive leads may be phosphorous δ-layers. In addition, the first and second electrically conductive leads may be connected via first and second vertical vias to the surface of the semiconductor substrate, respectively.

Further, the first end of the microwave resonator may be connected to the first vertical vias on the surface of the semiconductor substrate and the second end of the microwave resonator may be connected to the second vertical vias on the surface of the semiconductor substrate.

In some embodiments, the first and second qubits and the first and second electrically conductive leads are fabricated in the same plane in the semiconductor substrate approximately 50 nm below the semiconductor substrate surface. The first and second electrically conductive leads may be fabricated approximately 20 nanometres from the first and second qubits respectively.

In some embodiments, the microwave resonator is made of a thin, high-kinetic-inductance superconducting material. In one example, the microwave resonator is a $\lambda/2$ resonator.

In some example embodiments, the quantum processing system includes a first node and a second node. Each node comprises a plurality of qubits and the first qubit is part of the first node and the second qubit is part of the second node. In such cases, the distance between the first qubit and the second qubit is 1 millimetre to about 20 millimetres. Further, the distance between the pair of donor clusters in each qubit may be approximately 15-20 nanometres.

In another example, the distance between the first qubit and the second qubit is 10 micrometres to about 20 millimetres and the distance between pairs of donor clusters in each qubit is about 10-20 nanometers.

In an embodiment, each of the first and second donor clusters includes a single donor atom and the donor atom may be a phosphorous atom.

In some examples, the quantum processing system further includes additional gates located in the semiconductor substrate in proximity to each of the first and second qubits (e.g., located approximately 40-100 nm of the first and second qubits). The additional gates may be configured to generate a DC electric field gradient to electrically induce spin orbit coupling in the first and second qubits.

In another aspect of the present disclosure there is provided a method of operation of the quantum processing device of the first aspect, the method comprises the steps of: applying a static magnetic field to the quantum processing system to separate spin states associated with the first and second unpaired electrons and a nucleus of the first and second donor atom clusters of the first and second qubits, respectively: applying a local electric field to each of the first qubit and the second qubit to bring the corresponding first and second qubit in dispersive coupling with the microwave resonator: maintaining the first qubit and second qubit in the dispersive coupling with the microwave resonator for a predetermined period of time: and applying local electric fields to the first and second qubit after the predetermined period of time to take the first and second qubits out of the disperse coupling with the microwave resonator.

In some examples, amplitude of the static magnetic field is such that a frequency of the first and second qubit is within a threshold range of a frequency of the microwave resonator.

As used herein, except where the context requires otherwise, the term “comprise” and variations of the term, such as “comprising”, “comprises” and “comprised”, are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF DRAWINGS

Features and advantages of the present invention will become apparent from the following description of embodiments thereof, by way of example only, with reference to the accompanying drawings, in which.

DETAILED DESCRIPTION

As the magnetic dipole interaction between the electron spin and microwave photon is small, electrical coupling between the electron spin and microwave photon is preferable. Electrical coupling can be created and enhanced by inducing a spin-charge hybridisation, either through an extrinsic spin-orbit mechanism (engineered through implementation of an external magnetic field), or through an intrinsic spin-orbit mechanism.

In the past few years, a number of different types of quantum processing elements have been introduced that can be electrically coupled to superconducting microwave resonators. These types of quantum processing elements include a pair of quantum dots/sites and are based on a single electron spin that can be in two different charge states. By carefully adjusting the detuning ($\epsilon$), the electron can be put into a charge superposition between the two quantum dots/sites (forming a charge qubit). If the electron Zeeman splitting is comparable to the charge qubit splitting, the spin-orbit coupling will allow for the spin and charge states of the electron to become hybridized.

Figure 1A:
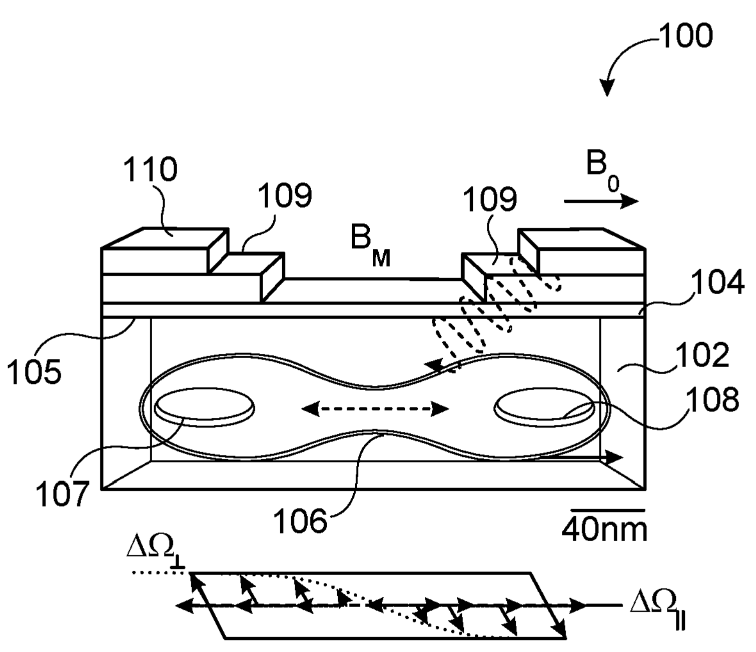
FIG. 1A is a schematic of an example qubit device.
Figure 1B:
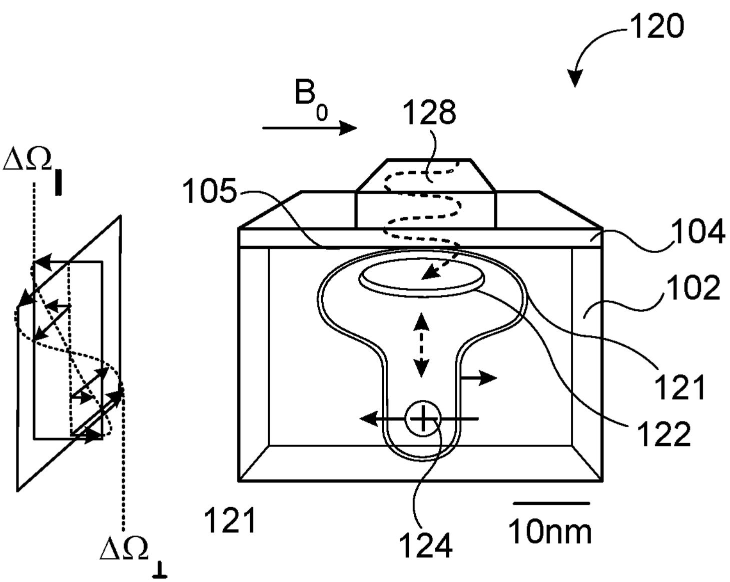
FIG. 1B is a schematic of another example qubit device.

FIG. 1A and FIG. 1B illustrate two types of previously known quantum processing elements that could be coupled to superconductor cavities to enable long distance qubit coupling.

The quantum processing element or device 100 shown in FIG. 1A includes a semiconductor substrate 102 and a dielectric 104. In this example, the semiconductor substrate 102 is $^{28}$silicon ($^{28}Si$) and the dielectric 104 is silicon dioxide ($SiO_2$). The semiconductor substrate 102 and dielectric 104 form an interface 105, which in this example is a $Si/SiO_2$ interface. A qubit 106 is formed in the semiconductor substrate 102. The qubit 106 includes two quantum dots 107 and 108 that share a single electron. Electronic confinement of the electrons in the two quantum dots is achieved by a gate 109 positioned on the dielectric 104. This type of qubit is referred to as a double quantum dot (DQD) qubit.

In addition, a micro-magnet 110 is fabricated on-chip and in particular on the dielectric 104 along with the gate 109. The micro-magnet 110 generates a local magnetic field gradient with longitudinal and transverse components that differs at the two quantum dot sites. The device 100 is coupled to a resonator (not shown). When the resonator field excites the electron from its orbital bonding to anti-bonding state, the electron is subjected to an effective spin-orbit coupling (SOC) as it moves across this magnetic field gradient and spin rotation driven by the electric field of the resonator is thus achieved.

FIG. 1B illustrates another example of a known qubit device 120 for coupling with a superconductor cavity. In this arrangement, the qubit 121 includes one quantum dot 122 and a donor atom 124. In particular, the qubit device 120 shown in FIG. 1B includes a semiconductor substrate 102 and a dielectric 104. In this example, the semiconductor substrate is $^{28}$silicon ($^{28}Si$) and the dielectric 104 is silicon dioxide ($SiO_2$). The semiconductor substrate 102 and dielectric 104 form an interface 105, which in this example is a $Si/SiO_2$ interface. The quantum dot 122 is formed near the interface 105, whereas the donor atom 124 is located within the substrate 102. A gate 128 is positioned above the quantum dot 122 (on the dielectric 104).

The gate electrode 128 is operable to interact with the donor atom 124. For example, the gate 128 may be used to induce an AC electric field in the region between the interface 105 and the donor atom 124 to modulate a hyperfine interaction between the electron (confined in the quantum dot 122) and the nucleus of the donor atom 124. When electrically driving the qubit 121, the electron spin flip-flops with the nuclear spin of the donor. That is the electric field can be used to control the quantum state of a qubit 121 associated with the pair of electron-nuclear spin eigenstates 'electron spin-up, nuclear spin-down" and 'electron spin-down, nuclear spin-up'. This type of qubit 121 is referred to as a flip-flop qubit.

In the DQD qubit 106, spin-orbit coupling is engineered by the micro-magnet 110. Further, the tip of the resonator is at the silicon surface in this case. Further still, the DQD qubit 106 needs extra confinement gates to form the qubit. Finally, the DQD qubit 106 requires precise design and fabrication of the micro-magnet 110 to engineer the desired highly local spatial field gradient.

Although the qubit 121 of FIG. 1B does not need a micro-magnet and exploits a hyperfine interaction at the single donor site it still includes a quantum dot 122 formed by a gate 128 near the interface 105. Therefore, the device 120 requires precise engineering, fabrication and control which can be challenging to implement.

To overcome one or more of these issues, aspects of the present disclosure provide a novel quantum processing element/qubit that allows for efficient spin-cavity coupling and thus for long range qubit entanglement. The qubit design does not require any on-chip magnets, distinguishing it from device 100. Further, the qubit can be manipulated with the electric field from a single photon of a superconducting microwave resonator.

Figure 2:
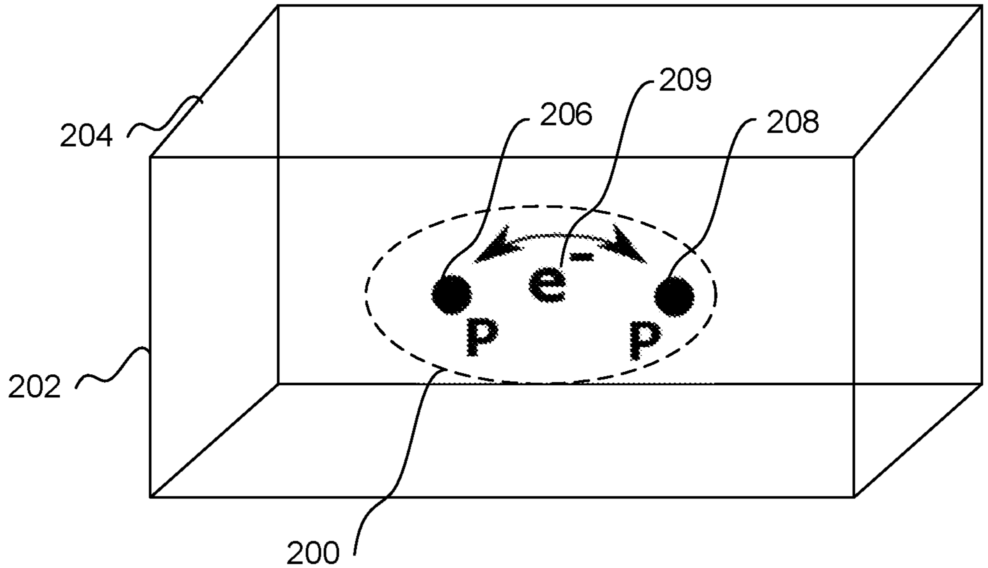
FIG. 2 is a schematic of a device according to some embodiments of the present disclosure.

FIG. 2 illustrates an example qubit 200 as disclosed herein. The qubit 200 is located in a semiconductor substrate 202 having a surface 204. In this example, the semiconductor substrate is $^{28}$silicon.

The qubit 200 includes a pair of tunnel-coupled donor atom clusters 206, 208 and a single electron 209 bound to the pair of donor atom clusters 206, 208. In certain embodiments, the donor atom clusters 206, 208 are placed in the silicon substrate 202 with atomic-scale precision using scanning tunneling lithography techniques. Further, in some examples, the donor atoms 206, 208 may be located approximately 50 nm below the surface 204.

The qubit 200 may be coupled to a resonator (not shown), which in some examples may be a high-impedance, co-planar, superconducting microwave resonator positioned at the silicon surface 204. The resonator couples to the qubit 200 by one or more delta-layer leads positioned tens of nanometers from one of the donors. The donor clusters 206, 208 are separated such that the single electron tunneling frequency is close to the resonance frequency of the resonator. In one example, the donor atom clusters 206, 208 may be approximately 15-20 nm apart from each other. In another example, they may be approximately 10-20 nm apart.

The qubit 200 uses a hyper-fine interaction from the electron-nuclear system in donor systems to generate an intrinsic spin-orbit coupling (SOC). In particular, in qubit 200, the spin-charge hybridization arises from a hyperfine interaction between the bound electron 209 and the nuclear spins of the donor atom clusters 206, 208. The hyper-fine interaction uses the ½ spin of the donor atom nuclei. The interaction strength between the electron 209 and nuclear spins is denoted $A_L$ and $A_R$, at the left and right donor sites respectively. The electron and nuclear spin states are entangled, and the resonator field can drive a transition to an excited state in which the electron spin and one of the nuclear spins have flipped orientations—the hyperfine interaction preserves total spin of the overall qubit 200. Spin qubit operation driven by the electric field of the resonator is achieved, without needing to fabricate a local micro-magnet (as required in device 100).

In certain embodiments, each donor cluster 206, 208 may have a single donor atom and the donor atom may be a phosphorous (P) atom such that the qubit 200 is a 1P-1P system. In other embodiments, the qubit 200 may be an nP-mP system and the donor atom clusters 206, 208 may have any other number of phosphorous donor atoms.

A constant external magnetic field is applied to split the energy levels of the electron and donor spins. The strength of the magnetic field is selected such as to bring the electron spin energy splitting close to the resonance frequency of the co-planar microwave resonator. For a typical co-planar microwave frequency range of 4-12 GHz, the strength of the magnetic field would be 0.14-0.43 Tesla.

In addition, electrically-conductive leads (not shown) are also defined with scanning-tunneling lithography near the nP-mP qubit 200 in the same crystal plane as the qubit, approximately 50 nm below the silicon surface. In some embodiments, these leads may be phosphorus δ-layers, which are connected by vertical vias to metal deposited on the silicon surface 204. The lead nearest to the donor atom clusters 206, 208 is connected at the silicon surface to one end of the resonator.

The resonator may be made of a thin (e.g., few nanometers), high-kinetic-inductance superconducting material. In one example, it is designed to be a λ/2 resonator so that the electric field anti-node is located at the donor atoms 206, 208, maximizing coupling to its charge dipole. This lead can also serve as the reservoir from which a single electron is loaded onto the qubit, at a time scale far slower than the resonance frequency.

The qubit 200 described here can be used to transfer quantum information between qubits separated at length scales of up to several millimetres, on the same silicon chip.

As the quantized electromagnetic field mode of the resonator mediates the quantum information transfer between qubits, it can be achieved at low power (at the level of a single microwave photon), and the resonator can mediate two-qubit gates. This addresses two of the major obstacles to scaling up mentioned previously—quantum information can be transferred between smaller qubit arrays, to give space for control gates in these smaller arrays, and it alleviates energy density concerns in the cryogenic environment.

Figure 3:
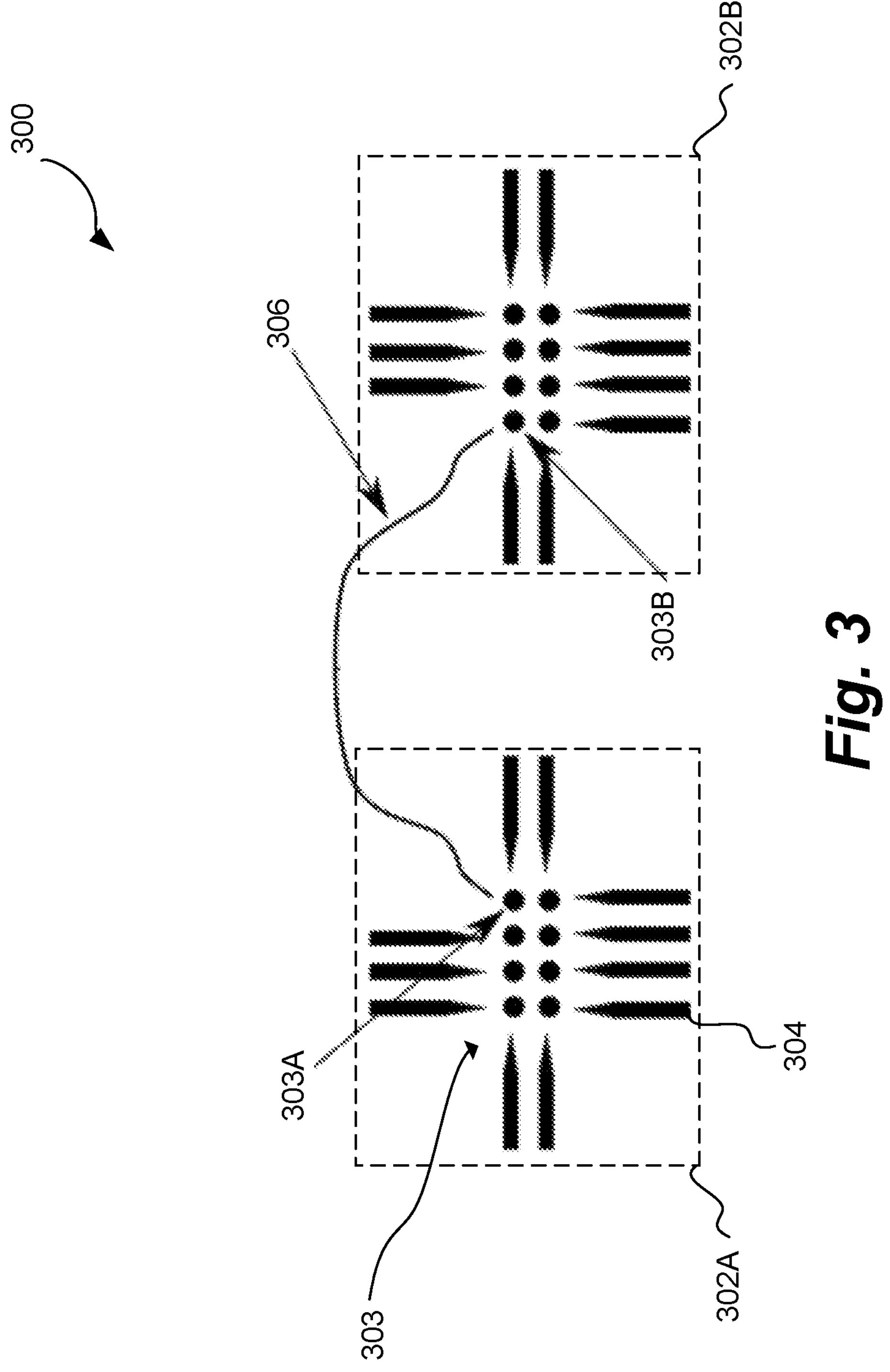
FIG. 3 is a schematic view of an example quantum processing unit according to some embodiments of the present disclosure.

A quantum processing unit (or QPU) for semiconductor quantum dots can include multiple arrays or nodes of qubits. FIG. 3 is a schematic diagram of an example QPU 300 according to some embodiments of the present disclosure. As seen in FIG. 3, the example QPU 300 includes two qubit nodes 302—nodes 302A and 302B. It will be appreciated that although FIG. 3 illustrates two nodes, in actual implementation the QPU may have many more nodes and the number of nodes utilized for a given QPU may depend on the particular application, the number of qubits located in each node, and the computational requirements of the QPU.

Each node 302 includes a plurality of qubits 303 arranged in a two dimensional array. The number of qubits 303 located in each node 302 depends on a number of factors such as the distance between qubits, the number of control lines and/or gates that can be accommodated on the node to address each qubit in the node 302, and the heat dissipated by the control circuitry. In some examples, the nodes 302 are small enough such that control gates 304 located on the chip surface or within the silicon substrate can address each individual qubit 303, and the qubits are close enough together for exchange interactions (i.e., at a length scale on the order of 10 nm). In the example shown in FIG. 3, each node 302 includes 8 qubits 303.

The nodes 302 can be separated by a few millimetres on the same silicon chip/substrate 202. Further, the nodes can be connected to each other by one or more resonators. In one implementation, a resonator 306 is connected between a pair of nodes and in particular, the resonator 306 is coupled with one qubit in each of the pair of nodes 302. In the example QPU 300, qubit 303A in node 302A is coupled with qubit 303B in node 302B via the resonator 306. As the resonator 306 can mediate two-qubit gate operations, quantum information can be transferred between the qubit nodes via the resonator 306, allowing for connectivity that is critical to implement useful quantum algorithms on a QPU.

In FIG. 3, the qubits that are coupled to the resonator 306 on each node 302 (i.e., qubit 303A and qubit 303B) are fabricated as the qubit shown in FIG. 2—that is, qubit 303A and qubit 303B are double donor cluster qubits 200. The other qubits on a node 302 may also be double donor atom qubits 200, however this is not essential. In some examples, the qubits that are not coupled to the resonator 306 may be any other type of qubits such as simple donor qubits or gate controlled qubits without departing from the scope of the present embodiment. Further, the qubits 303 on each node 302 may be coupled to their nearest neighbours via exchange coupling.

Figure 4:
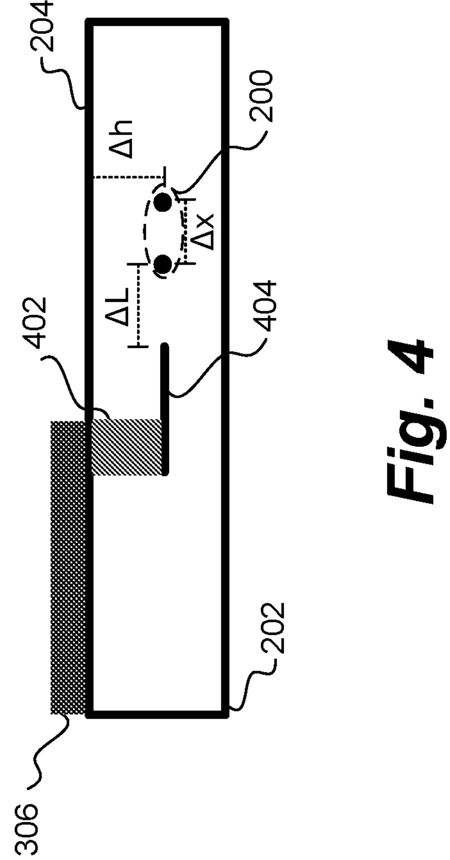
FIG. 4 is a schematic side view of the microwave resonator, terminating in a phosphorous δ-layer lead below the Si surface, and qubit.

FIG. 4 is a schematic illustration of one end of a resonator, e.g., resonator 306 and in particular a $\lambda/2$ microwave resonator. The resonator 306 is at the surface of the silicon substrate 202. In some examples, the resonator 306 is made from a thin, high-impedance superconducting film. One end of the resonator 306 contacts a vertical metal via 402, which connects the resonator 306 to a lead 404 within the silicon substrate 202. In some examples, the lead 404 may be a $\delta$-layer lead. Further, the lead 404 may be positioned approximately 50 nm below the silicon surface and on the same plane as the qubit 200. This brings the electric anti-node close to the double donor atom qubit 200. The distance between the lead 404 and the qubit 200 is denoted as $\Delta L$, the distance between the donor atoms is denoted as $\Delta x$ and the depth of the qubit 200 from the surface of the semiconductor surface 204 is denoted as $\Delta h$.

Figure 5:
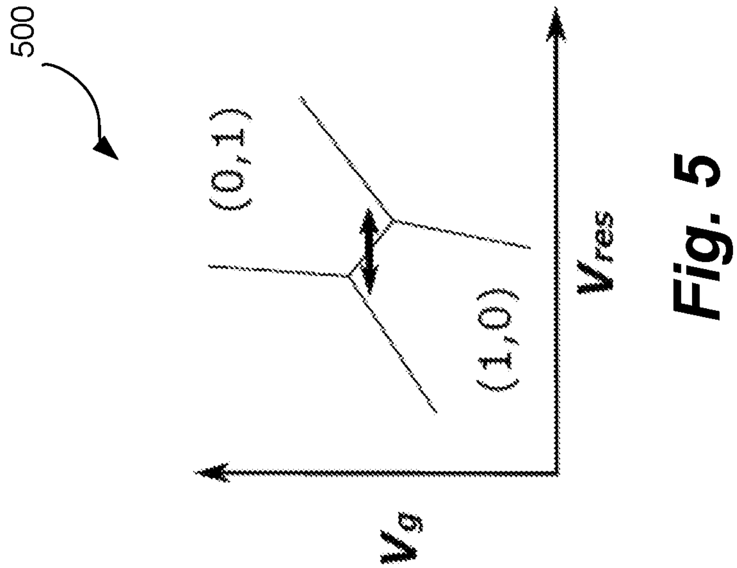
FIG. 5 illustrates the operating point in gate space for a 1P-1P qubit coupled to the resonator.

In the case the double donor atom qubit 200 is a 1P-1P system, the operating point in gate space for the 1P-1P qubit strongly coupled to the quantized resonator mode is at the (1, 0)-(0, 1) transition. FIG. 5 is a chart showing the operating point in gate space for the 1P-1P qubit 200 coupled to the resonator 306. In particular, along the x-axis, the chart plots the resonator voltage $V_{res}$ and along the y axis, the chart plots the gate voltage $V_g$. (1, 0) denotes electron occupation number on the left donor cluster 206 and (0, 1) denotes electron occupation number of the right donor cluster 208. The resonator lever arm, or the coupling to the 1P-1P charge dipole, should be strong enough for the electric field $\varepsilon_0$ of a single microwave resonator photon to drive the electron occupation across this transition.

Figures 6A, 6B:
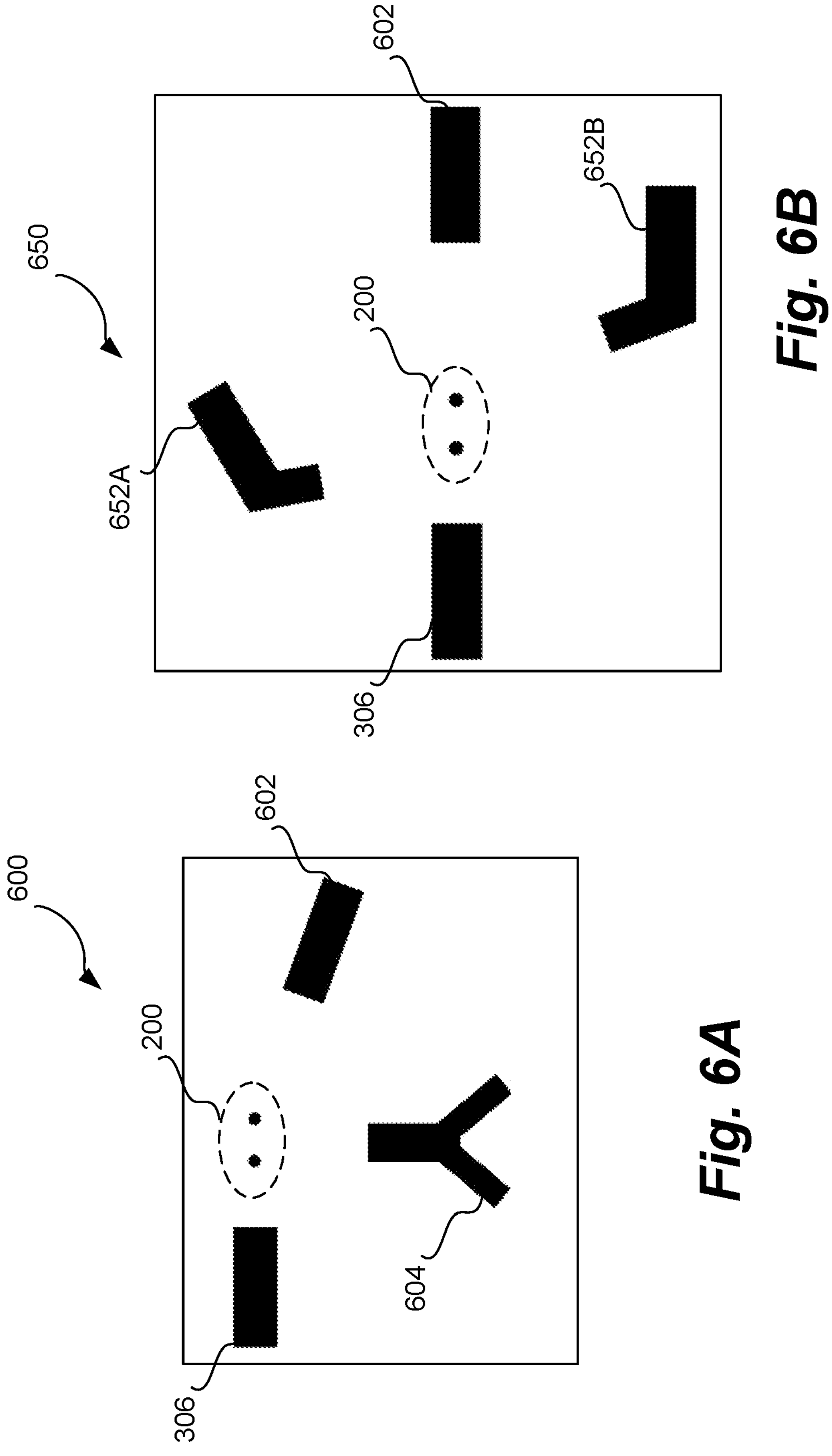
FIG. 6A is an example device layout to use the hyperfine interaction (HF) for spin-orbit coupling.
FIG. 6B is an example device layout, to use both the HF and ‘electrically-induced spin orbit (EISO) mechanisms.

FIG. 6A is a top view of an example device 600 that uses hyperfine interaction (HF) between the electron and the nuclei for spin-orbit coupling. In particular, FIG. 6A shows a top view of a single qubit 200 coupled to a resonator 306 along with the circuitry required for the qubit 200 to function. As shown in FIG. 6, the device 600 includes a gate 602 positioned close to the qubit to control operation of the qubit 200. The gate 602 may include a metallic contact on the semiconductor surface 204, which is connected to a $\delta$-layer lead (fabricated on the same plane as the qubit 200) via metallic leads or vias.

In addition to the gate 602, the device may include a charge sensing device 604. In some embodiments, this charge sensing device may be a single electron transistor (SET) positioned close to the qubit 200 and in the same plane as the qubit. In other embodiments, the gate 602 or the resonator 306 may act as the charge sensing device 604. In such cases, an additional charge sensor may not be required.

Another way of achieving electron spin-photon coupling is through an electrically induced spin-orbit interaction. Previous studies have shown that in the presence of electric fields at the donor clusters, the spin-orbit coupling that directly couples the external electric field and magnetic field can dominate over Rashba spin-orbit coupling and the spin-orbit from bulk Si crystal. If the electric fields from the surrounding gates are different between the two donors, the electron spin-orbit can create an effective inhomogeneous field and therefore rotate its spin.

FIG. 6B is a top view of an example device 650 that uses such an electrically-induced spin orbit (EISO) mechanism along with the hyperfine mechanism to operate the qubit 200. As with FIG. 6A, FIG. 6B shows a top view of a single qubit 200 coupled to a resonator 306 along with the circuitry required for the qubit 200 to function and to electrically induce a spin-orbit coupling. As shown in FIG. 6B, the device 650 includes a gate 602 positioned close to the qubit 200 to control operation of the qubit 200. The device 650 also includes two additional EISO gates 652A, 652B. In some examples, the gates 602, 652A, 652B may be located within the silicon substrate 202 in the same plane as the qubit 200. In other examples, one or more of the gates 602, 652A, 652B may be positioned on the semiconductor surface 204. In such cases, the gates may be connected to the qubit 200 via metallic leads or vias. The EISO gates 652A, 652B on the sides create a strong DC electric field gradient that can result in a similar effect as the hyperfine interaction.

Hyperfine-mediated spin-photon coupling depends on the initial nuclear states of the donors and therefore a device that operated simply based on hyperfine interaction would have to be initialised with the correct nuclear states before it can be operated. EISO interaction, on the other hand, allows for spin-photon coupling independently of the initial nuclear states and therefore if EISO gates were used in a device, there would be no need for initializing the nuclear state of the donor atoms in such devices before they can be operated.

Figure 6C:
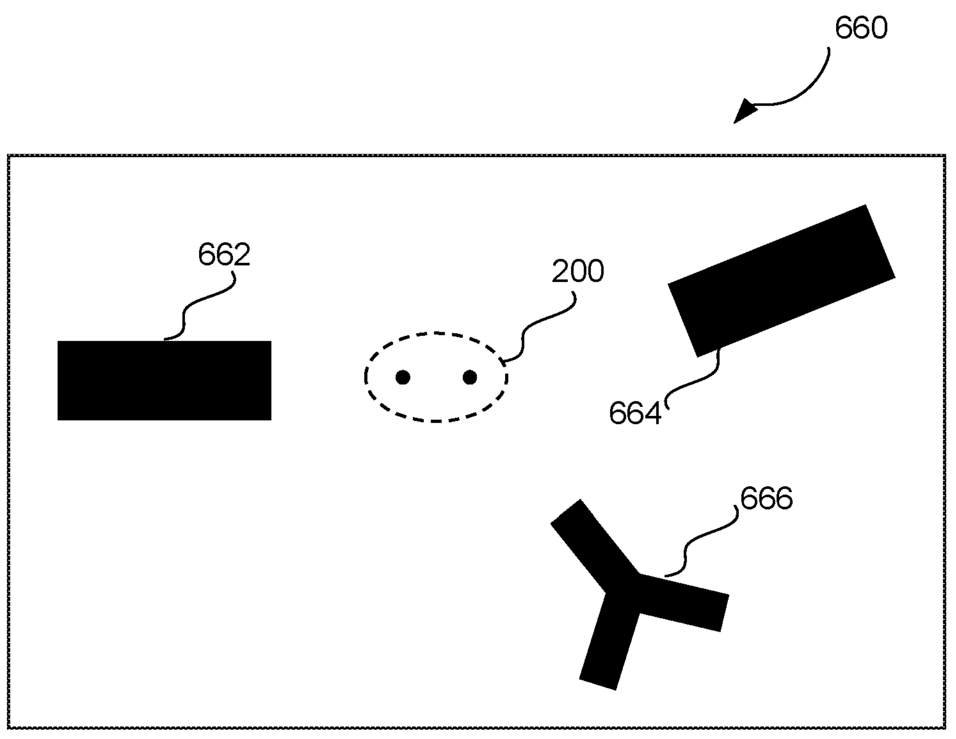
FIG. 6C is another example device layout according to aspects of the present disclosure.

FIG. 6C is a top view of another example device 660 that uses hyperfine interaction (HF) between the electron and the nuclei for spin-orbit coupling. In particular, FIG. 6C shows a top view of a single qubit 200 coupled to a resonator 306 along with the circuitry required for the qubit 200 to function. The left and right dots in the qubit may be positioned about 10-20 nanometers apart to ensure tunnel coupling close to the resonant frequency of the resonator 306. As shown in FIG. 6C, the device 660 includes a reservoir gate 662 positioned to the left of the qubit 200. The reservoir gate 662 is placed 15-30 nanometers away from the qubit 200 and is electrically connected to a resonator e.g., resonator 306 (not shown in this figure) through a metal via (not shown). The short distance between the reservoir gate 662 and the qubit 200 is chosen for this gate to act as an electron reservoir for the qubit 200 and to maximise the resonant voltage induced by the resonator 306 on the qubit.

The device 660 may further include another gate 664 positioned close tot he qubit to control operation of the qubit 200. The gates 664 may include metallic contacts on the semiconductor surface 204, which is connected to a δ-layer lead (fabricated on the same plane as the qubit 200) via metallic leads or vias.

In addition to the gate 664, the device 660 may include a charge sensing device 666. In some embodiments, this charge sensing device 666 may be a single electron transistor (SET) positioned 30-100 nanometers away from the qubit 200 and in the same plane as the qubit 200. The SET 604 is asymmetrically positioned with respect to the two donor clusters of the qubit 200 to result in different lever arm parameters and be able to discriminate which cluster is probed when tracking the SET response. In other embodiments, the gates 662, 664 or the resonator 306 may act as the charge sensing device 666. In such cases, an additional charge sensor may not be required.

Figure 7:
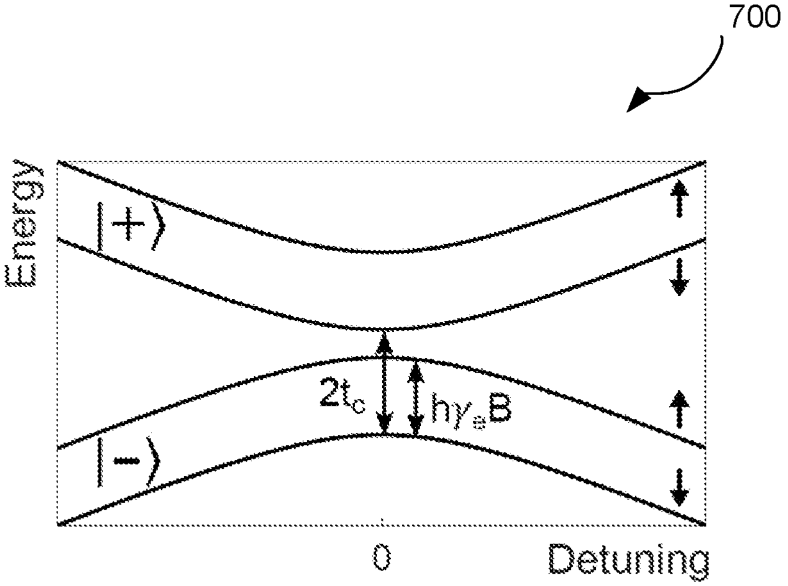
FIG. 7 is a graph of system energy levels as a function of detuning.

FIG. 7 is a graph 700 depicting system energy levels E as a function of detuning ($\epsilon$) between P donors. At zero detuning the electron 209 forms bonding $|-\rangle$ and anti-bonding $|+\rangle$ orbitals, split by tunnelling energy $2t_c$. Here $|\mp\rangle=(|L\rangle\pm|R\rangle)/\sqrt{2}$, where $|L\rangle$ and $|R\rangle$ indicate electron localization on the left or right donor cluster 206, 208, respectively. Each of the $|-\rangle$ and $|+\rangle$ levels are further split in energy due to an applied external magnetic field B, with spin Zeeman splitting between electron spin $\downarrow$ and $\uparrow$ states indicated by $h\gamma_e B$. Where h is Planck's constant and $\gamma_e$ is the electron spin gyromagnetic ratio. At non-zero detuning the electron density is shifted to the donor of lower potential energy—in limiting case of very large detuning the electron occupies only one donor site.

Figure 8:
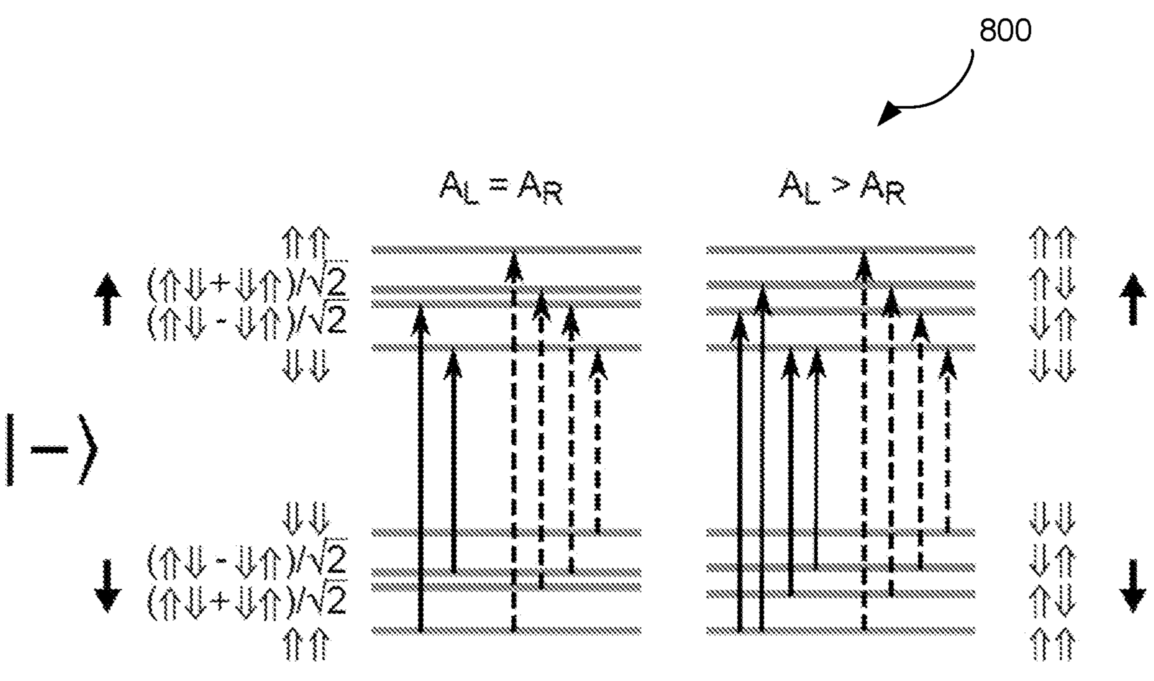
FIG. 8 is a scheme of system energy levels for zero detuning for symmetric and asymmetric hyperfine interactions.

Each of the energy levels depicted in FIG. 7 is further split into four states due to nuclear Zeeman interaction and hyperfine interaction (as shown in FIG. 8). The qubit subspace is specified within the bonding $|-\rangle$ state manifold while the proximity of the antibonding $|+\rangle$ orbital plays a mediating role, enabling the charge-spin coupling. FIG. 7 is a schematic of system energy levels E for zero detuning for symmetric ($A_L=A_R$) and asymmetric ($A_L>A_R$) hyperfine interaction. Solid arrows in FIG. 8 indicate transitions mediated by hyperfine interaction whereas the dashed arrows show transitions forbidden by the hyperfine interaction but driven by electrically-induced spin-orbit interaction or EISO interaction.

The eigenstates shown in FIG. 8 are determined by the total system Hamiltonian, H. In the $|DI_LI_RS\rangle$ basis, where D defines an electron localization on the left or right donor $|L\rangle$ or $|R\rangle$, $I_L$ and $I_R$ indicate the left and right nuclear spin (with a polarisation $|\Uparrow\rangle$ or $|\Downarrow\rangle$), and S defines the electron spin ($|\uparrow\rangle$ or $|\downarrow\rangle$), the Hamiltonian reads—

$$H = H_0 + H_{HF} + H_{EISO} \tag{1}$$

where $$H_0 = -t_c\tau_x + \epsilon\tau_z + h\gamma_e B\cdot S + \Sigma_{j=L,R} h\gamma_e B\cdot I_j \tag{2}$$

$\tau$ are the Pauli matrices in the left/right donor basis, while $$S = \frac{1}{2}\{\sigma_x^e, \sigma_y^e, \sigma_z^e\} \text{ and } I = \frac{1}{2}\{\sigma_x^P, \sigma_y^P, \sigma_z^P\}$$

are the electron and donor spin operators with $\sigma^e$ ($\sigma^P$) being the Pauli matrices in the electron (donor) spin basis. The electron and nuclear spin gyromagnetic ratios in Si are $\gamma_e$=27.97 GHz/T and $\gamma_P$=−17.23 MHz/T, respectively.

$H_{HF}$ is the Hamiltonian describing the hyperfine interaction that mixes the electrons spatial and spin degrees of freedom. It can be expressed as:

$$H_{HF} = hA_L I_L\cdot S\otimes|L\rangle\langle L| + hA_R I_R\cdot S\otimes|R\rangle\langle R| \tag{3}$$

where $A_L$ ($A_R$) represents the hyperfine constant of the left (right) donor. The Si bulk value of the hyperfine constants is approximately $A_L=A_R$=117 MHz. The electron-nuclear spin product can be expressed as $I\cdot S=I_zS_z+\frac{1}{2}(I_+S_-+I_-S_+)$. The dependency of hyperfine interaction on electron localization (on left or right donor) introduces charge-spin hybridization. This is because, due to hyperfine coupling, eigenstates of Hamiltonian $H_0$ acquire admixtures of different spin and orbital states.

While hyperfine interaction is intrinsic and therefore present at all times in 1P-1P systems, electrically-induced spin-orbit interaction $H_{EISO}$ can be switched on and off as needed. The EISO arises when, within the donor region, we apply an electric field E perpendicular to the external magnetic field B (for example, using the EISO gates shown in FIG. 6B).

For B polarized in z and E in y direction, $H_{EISO}$ takes the following form—

$$H_{EISO} = \begin{pmatrix} E_y^L B_z C & 0 \\ 0 & E_y^R B_z C \end{pmatrix} \otimes \sigma_x^e \tag{4}$$

Where the first matrix is in the $\{|L\rangle, |R\rangle\}$ basis and $$\sigma_x^e$$

is the Pauli x matrix in electron spin basis. $H_{EISO}$ does not influence the nuclear spins thus it is considered the identity in the nuclear spin basis subspace. The coefficient (C) is estimated to be about $6\times10^{-14}$ em/T for single donors in silicon.

$$E_y^L$$

and $$E_y^R$$

correspond to electric field at the left and right donor sites, respectively. The difference between $$E_y^L$$

and $$E_y^R$$

is required to generate charge-spin hybridization.

In FIG. 8 the lowest eight eigenstates of Hamiltonian H are shown for symmetric ($A_L=A_R$) and asymmetric ($A_L>A_R$ or equivalently $\epsilon<0$) hyperfine interaction. Symbols {⇑, ⇓}, {↑, ↓}, {|−⟩, |+⟩} describe the majority part of each eigenstate. It should be noted that due to hyperfine interaction those eigenstates also include some small but non-zero admixtures of different basis states.

System interaction with cavity photons can be described by Hamiltonian $$H_c = \hbar g_c(a + a^{\dagger})\tau_z \tag{5}$$

Where a ($a^{\dagger}$) is the annihilation (creation) operator for the microwave resonator mode. Assuming the cavity field is described by amplitude $\varepsilon_0$ and frequency $f_r$ and has a non-zero polarization component along the x-axis, the charge coupling rate $g_c$ can be defined $$\hbar g_c \equiv \varepsilon_0 d_c = e\epsilon_0 |\langle -|x|+\rangle|.$$

The solid and dashed vertical arrows in FIG. 8 indicate all the $H_c$-driven transitions which rotate electron spin—provided the resonator frequency $f_r$ is matched to the energy splitting between the appropriate pair of states. Solid arrows show transitions which are feasible without any electrically-induced spin-orbit (i.e., even when $H_{EISO}=0$) and are mediated solely by hyperfine interaction. Dashed arrows show transitions, which become accessible once EISO is switched on with $H_{EISO}\neq0$ and $$E_y^L \neq E_y^R.$$

The energy splitting between ⇑⇑↓ and ⇓⇓↓ states is approximately $(A_L+A_R)/4-2h\gamma_P B$, which for P donors in silicon gives values on the order of 100 MHz. Energy splitting between ⇑⇓↓ and ⇓⇑↓ states is dependent on hyperfine interaction asymmetry and is approximately $(A_L-A_R)/4$. However, even at $A_L=A_R$ the splitting between zero-nuclear-spin states (nuclear singlet and triplet) is non-zero due to mixing ⇓⇓↓ and $$\frac{1}{\sqrt{2}}(\Uparrow\Downarrow + \Downarrow\Uparrow)\uparrow$$

states by hyperfine interaction. This splitting decreases with increasing magnetic field and for B of about 0.2 T is on the order of 0.1 MHz.

Each of the transitions depicted in FIG. 8 can be valid points for qubit operation, with the qubit itself defined by the initial and final eigenstates corresponding to a particular transition. The common feature of each such qubit subspace is rotation of electron spin. For hyperfine-mediated transitions the electron spin rotation is accompanied by nuclear spin flip (analogously to flip-flop qubit) while for EISO-mediated transitions the nuclear spin configuration is conserved.

To select a specific qubit working point, the desired nuclear spin configuration needs to be initialized, which can be achieved with nuclear polarization methods such as Nuclear Magnetic Resonance (NMR) or Dynamic Nuclear Polarisation.

For a given cavity frequency $f_r$ the qubit is brought into resonance by adjusting external magnetic field B and thereby the qubit energy splitting. For the standard resonator frequency bandwidth of 4-12 GHz, magnetic fields in the range of 0.14-0.43 T are required. As the spin-photon coupling is reliant on different spin and orbital states admixtures to the $H_0$ eigenstates, maximization of charge-spin hybridization is desired and this is dependent on how close the antibonding |+⟩ manifold is to the qubit subspace.

Figure 9:
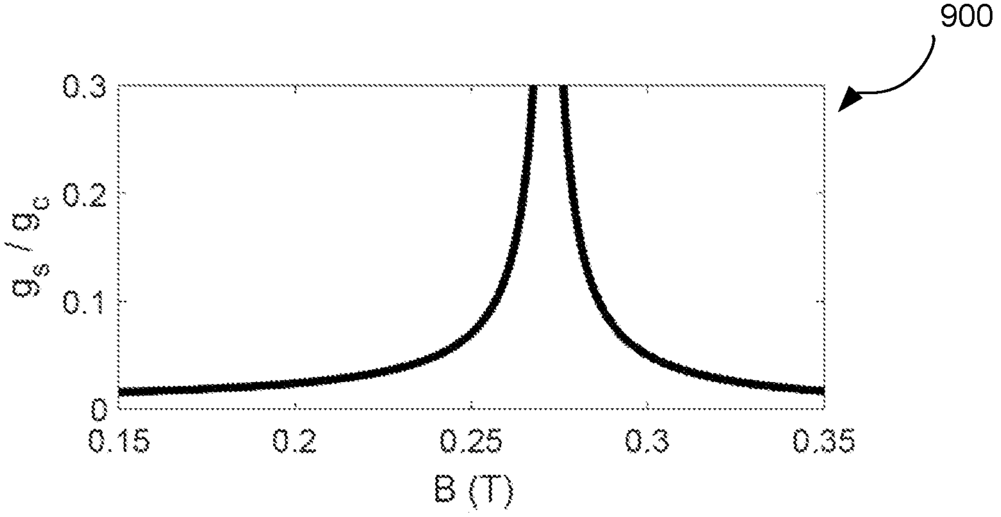
FIG. 9 is a graph of spin-photon coupling as a function of external magnetic field.

Referring to FIG. 9, cavity-spin coupling $g_s/g_c$ between states 1 and 6 (i.e., the left-most transition in FIG. 8) is shown as a function of magnetic field B for a given value of $2t_c/h=7.64$ GHz. The coupling is calculated by evaluating $H_c$ between the eigenstates 1 and 6: $\hbar g_s=|\langle\Psi_1|H_c|\Psi_6\rangle|$.

Figure 10:
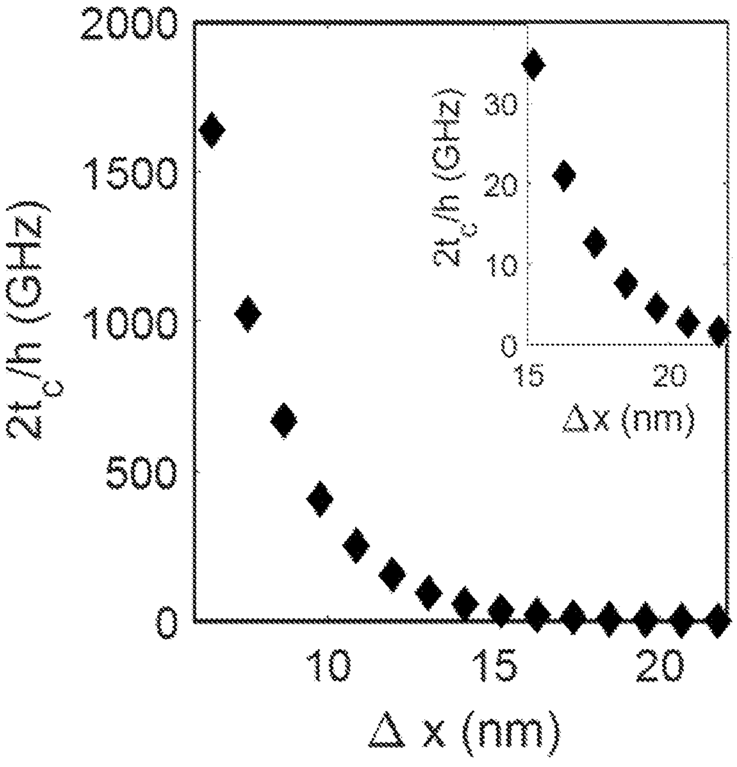
FIG. 10 is a graph of tunnelling energy as a function of donor separation.

The abrupt increase of $g_s$ at B≈0.272 T is due to bringing the |−↑⟩ manifold to degeneracy with the |+⟩ states. Operating very close to that point is not desired as it increases decoherence. However, setting the tunnelling energy not equal but comparable to $f_r$ allows to obtain still significant values of $g_s>0.01g_c$. The tunnelling rate in the 1P-1P system can be controlled by adjusting the donor separation. Referring to FIG. 10, which shows the tunnelling rate $2t_c/h$ as a function of donor separation Δx—as calculated with atomistic tight-binding simulations. According to that data, for cavity bandwidth of 4-12 GHz the optimal 1P-1P separation lies in 15-20 nm range.

For comparison, for EISO-mediated transitions obtaining spin-photon coupling of about $g_s=0.01$ g. at B=0.2 T and $2t_c h=7.64$ GHz would require applying approximately 12 MV/m electric field difference between the donors 206, 208. The electric field difference can be distributed between both donors, e.g.

$$E_y^L = 6 \text{ MV/m}$$

and $$E_y^R = -6 \text{ MV/m}.$$

The different electric fields at the two donor sites can be produced with additional EISO gates as shown in FIG. 6B.

As the charge-photon coupling is proportional to the system dipole moment $d_c$ and the amplitude of the electric field due to one photon in the cavity $\varepsilon_0$, maximising both parameters is desired. Since the electron wave function is strongly localized within the donor regions, the dipole moment can be well approximated with ½ of the donor separation $d_c \approx e\Delta x/2$. As mentioned earlier, Δx (i.e., the distance between the donor clusters 206, 208 of qubit 200) is restricted by corresponding tunnelling values and optimally takes on values in the 15-20 nm range. The cavity electric field $\varepsilon_0$ can be maximized by appropriate donor placement with respect to the phosphorous δ-layer lead, by adjusting ΔL value (see FIG. 4).

Figure 11:
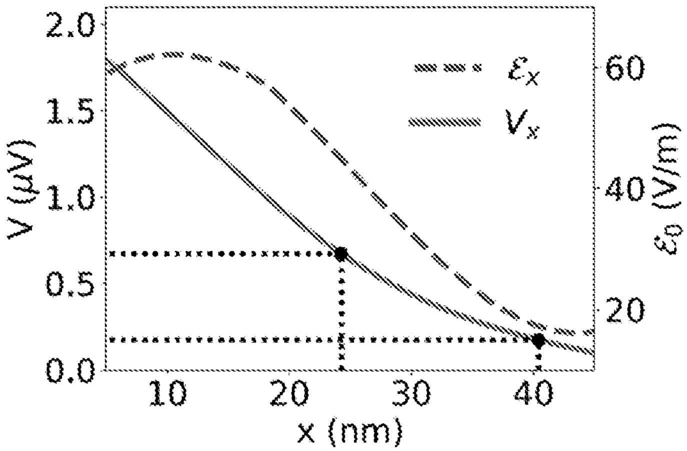
FIG. 11 is a graph of voltage and electric field from a single photon in the resonator mode as a function of distance from the δ-layer lead.

FIG. 11 is a chart 1100 illustrating the electric potential V and electric field ($\varepsilon_0$) from a single photon in the resonator mode as a function of x (i.e., distance from δ-layer lead 502). With Δx~10-20 nm and ΔL>20 nm (to ensure the tunnelling frequency from the lead to the closest donor is slower than any other time scale in the system) it is still possible to achieve donor detuning of ΔV~0.5 μV and $g_c = e\Delta V/2h$ on the order of 100 MHz. Thus, with $g_s/g_c$~1-10% of the spin-cavity coupling on the order of 1 MHz is achievable within device 200. Contacting the ends of a λ/2 microwave resonator 306 with the phosphorous δ-layer lead buried at the qubit layer is a distinctive feature of the proposed design. This allows the double donors to be positioned in a region of high electric field, significantly enhancing the charge-photon coupling of the system.

The extension of the proposed device 200 to other donor clusters systems is possible although the system specification has to be adjusted accordingly. For systems with the same number of donors in each, cluster both the cluster separation and the number of electrons needs to be modified. For example, if each donor cluster includes 2 phosphorous donor atoms, the 2P-2P qubit may include 3 electrons. Similarly, if each donor cluster includes 3 phosphorous donor atoms, the 3P-3P qubit may include 5 electrons. Alternatively, for asymmetric systems (i.e., systems that have a different number of donor atoms in the donor clusters, such as 1P-2P, 2P-3P, etc.), additional detuning is needed to bring the system to the bonding-antibonding states anti-crossing. In both cases, the possible transitions and qubit subspaces have to be refined.

Figure 12:
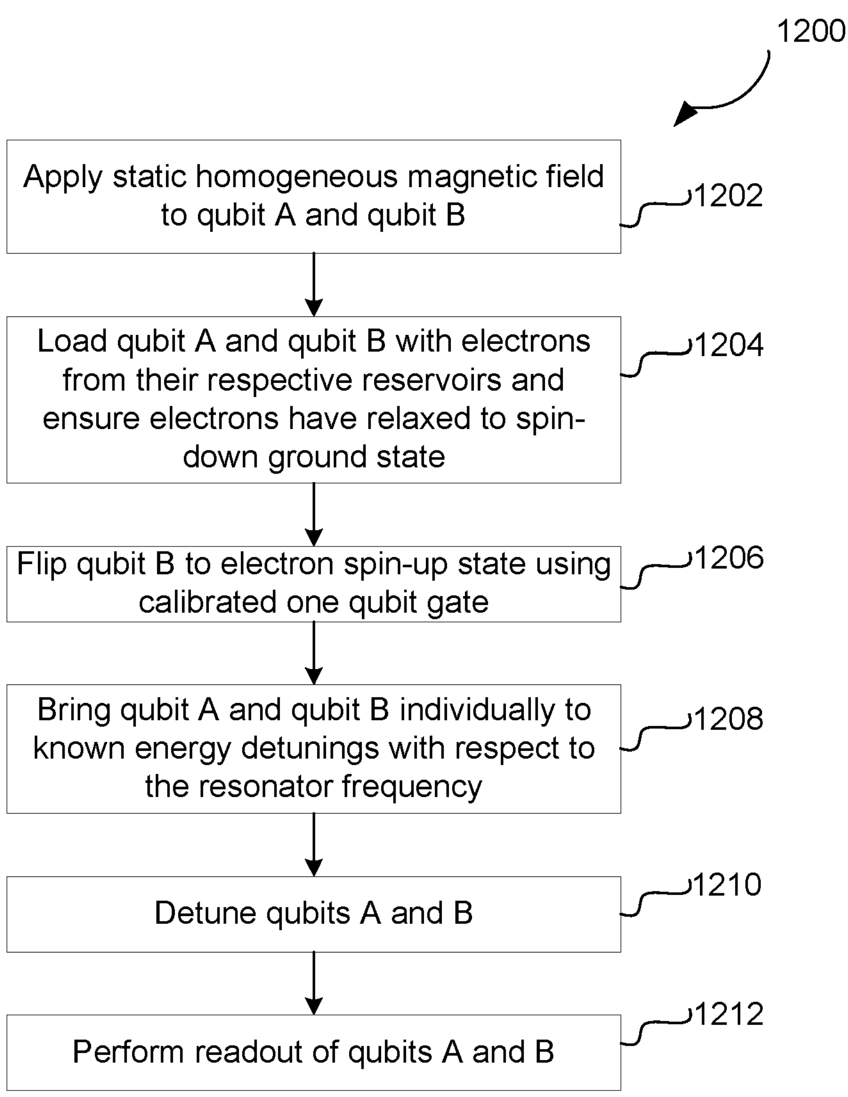
FIG. 12 is a flowchart of an example method of coupling two qubits via a resonator cavity according to some embodiments of the present disclosure.

FIG. 12 illustrates an example method 1200 for coupling two qubits—for example qubit A and qubit B of FIG. 3 via a resonator. For example, this method describes an 'iSWAP' interaction between qubit A and qubit B via a resonator.

The method 1200 commences at step 1202, where a magnetic field is applied to qubit A and qubit B. In some embodiments, the magnetic field is a static homogenous field. The strength of the external magnetic field is such that the Zeeman splitting brings the qubit energy splitting close to the resonator frequency. In one example, the external magnetic field may be set to 0.2 T.

At step 1204, the double-donor structures of which qubit A and qubit B are comprised are loaded with electrons from their respective reservoirs. The number of electrons loaded in each cluster depends on the double donor cluster system in use. If a IP-IP system is used, a single electron is loaded into qubit A and/or qubit B. Alternatively, in case of any other nP-mP system, more than one electron may be loaded. Electron loading can be achieved using one or more gates (e.g., gate 602 shown in FIG. 6A or FIG. 6B) to apply local detunings, in order to navigate to the appropriate electron occupation region in gate space (e.g., the (1, 0)-(0,1) transition space in FIG. 5). It is ensured, by waiting in the appropriate region in gate space, that the loaded electrons have relaxed to their spin-down ground state.

At step 1206, electron spin of qubit B is flipped. In one embodiment, the electron spin is flipped to the spin-up state using a calibrated one-qubit gate, e.g., through an oscillating magnetic or electric field (electron spin resonance or electric dipole spin resonance).

Next, at step 1208, qubit A and qubit B are individually brought to known energy detunings with respect to the resonator frequency. The detuning of qubit A relative to the resonator frequency may or may not be the same as the detuning of qubit B relative to the resonator frequency. In this "dispersive" regime, $E_A$, $E_B$<$hf_0$, and $\hbar g_A$, $\hbar g_B$<<$|E_{A,B} - hf_0|$. Here, $E_{A,B}$ are the energies of qubits A and B, respectively, taking into account their Zeeman energies (assumed to be equal), and the energy due to their individual detunings (which can be equal, but need not be). Furthermore, here the energy of a microwave photon in the resonator is $hf_0$, and $g_A$ and $g_B$ are the coupling rates of qubits A and B to the cavity, respectively.

At step 1210, the fixed detunings of qubit A and qubit B with respect to the resonator frequency are maintained for a time $\tau = \pi|\sqrt{\Delta_A \Delta_B}|/(2g_A g_B)$. Where, $\Delta_4$ and $\Delta_B$ denote the energy detunings of qubit A and qubit B from the resonator, respectively. In this characteristic time τ, the free evolution of the coupled system effectuates the "iSWAP" gate between qubit A and qubit B.

At step 1212, after time τ, both qubits should be far-detuned from the resonator frequency, to end the gate interaction.

Finally, if desired, the states of qubit A and qubit B can be independently measured, to verify that the iSWAP gate between the two qubits in fact occurred. In certain embodiments, this readout can be achieved with conventional techniques, e.g. using two single electron transistors that have been fabricated on the chip close to qubit A and qubit B.

It will be appreciated that although method 1200 is described with reference to an iSWAP gate operation, the method 1200 can be implemented with slight modifications to perform other types of operations between qubits A and B without departing from the scope of the present disclosure.

The methods and the quantum processor architectures described herein uses quantum mechanics to perform computation. The processors, for example, may be used for a range of applications and provide enhanced computation performance, these applications include: encryption and decryption of information, advanced chemistry simulation, optimization, machine learning, pattern recognition, anomaly detection, financial analysis and validation amongst others.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A quantum processing system comprising:

a first qubit comprising a first unpaired electron bound to a first pair of donor clusters embedded in a semiconductor substrate at a distance from a surface of the semiconductor substrate, each donor cluster in the first pair of donor clusters including at least one donor atom;

a second qubit comprising a second unpaired electron bound to a second pair of donor clusters embedded in the semiconductor substrate at a distance from the surface of the semiconductor substrate, each donor cluster in the second pair of donor clusters including at least one donor atom; and a microwave resonator located between the first qubit and the second qubit, wherein a first end of the microwave resonator is coupled to the first qubit and a second end of the microwave resonator is coupled to the second qubit;

wherein a photon of the microwave resonator couples the first qubit and the second qubit.

2. The quantum processing system of claim 1, wherein the donor clusters in the first pair of donor clusters and the second pair of donor clusters are separated such that a tunnelling frequency of the first unpaired electron and second unpaired electron is close to a resonance frequency of the microwave resonator.

3. The quantum processing system of claim 1, further comprises first and second electrically-conductive leads fabricated within the semiconductor substrate in proximity to each of the first and second qubits.

4. The quantum processing system of claim 3, wherein the first and second electrically conductive leads are phosphorous δ-layers.

5. The quantum processing system of claim 3, wherein the first and second electrically conductive leads are connected via first and second vertical vias to the surface of the semiconductor substrate, respectively.

6. The quantum processing system of claim 5, wherein the first end of the microwave resonator is connected to the first vertical vias on the surface of the semiconductor substrate and the second end of the microwave resonator is connected to the second vertical vias on the surface of the semiconductor substrate.

7. The quantum processing system of claim 3, wherein the first and second qubits and the first and second electrically conductive leads are fabricated in a same plane in the semiconductor substrate approximately 50 nm below the surface of the semiconductor substrate.

8. The quantum processing system of claim 3, wherein the first and second electrically conductive leads are fabricated approximately 20 nanometres from the first and second qubits respectively.

9. The quantum processing system of claim 1, wherein the microwave resonator is made of a thin, high-kinetic-inductance superconducting material.

10. The quantum processing system of claim 1, wherein the microwave resonator is a $\lambda/2$ resonator.

11. The quantum processing system of claim 1, further comprising a first node and a second node, wherein each node comprises a plurality of qubits and wherein the first qubit is part of the first node and the second qubit is part of the second node.

12. The quantum processing system of claim 1, wherein the distance between the first qubit and the second qubit is 100 micrometres to about 20 millimetres.

13. The quantum processing system of claim 1, wherein the distance between the pair of donor clusters is approximately 10-20 nanometres.

14. The quantum processing system of claim 1, wherein each of the first and second donor clusters includes a single donor atom.

15. The quantum processing system of claim 14, wherein the donor atom is phosphorous.

16. The quantum processing system of claim 1, wherein additional gates are located in the semiconductor substrate in proximity to each of the first and second qubits, wherein the additional gates are configured to generate a DC electric field gradient to electrically induce spin orbit coupling in the first and second qubits.

17. The quantum processing system of claim 1, wherein a continuous external magnetic field is applied to the quantum processing system to separate spin states associated with the first and second unpaired electrons and nuclei of the corresponding donor atom clusters.

18. The quantum processing system of claim 17, wherein a strength of the magnetic field is between 0.14-0.43 Tesla.

19. A method of operating a quantum processing device, the quantum processing device comprising:

a first qubit comprising a first unpaired electron bound to a first pair of donor clusters embedded in a semiconductor substrate at a distance from a surface of the semiconductor substrate, each donor cluster in the first pair of donor clusters including at least one donor atom;

a second qubit comprising a second unpaired electron bound to a second pair of donor clusters embedded in the semiconductor substrate at a distance from the surface of the semiconductor substrate, each donor cluster in the second pair of donor clusters including at least one donor atom; and a microwave resonator located between the first qubit and the second qubit, wherein a first end of the microwave resonator is coupled to the first qubit and a second end of the microwave resonator is coupled to the second qubit; and wherein a photon of the microwave resonator couples the first qubit and the second qubit;

the method comprising:

applying a static magnetic field to the quantum processing system to separate spin states associated with the first and second unpaired electrons and nuclei of the first and second pairs of donor clusters of the first and second qubits, respectively;

applying a local electric field to each of the first qubit and the second qubit to bring the corresponding first and second qubit in dispersive coupling with the microwave resonator;

maintaining the first qubit and second qubit in the dispersive coupling with the microwave resonator for a predetermined period of time; and applying local electric fields to the first and second qubit after the predetermined period of time to take the first and second qubits out of the disperse coupling with the microwave resonator.

20. The method of claim 19 wherein an amplitude of the static magnetic field is such that a frequency of the first and second qubit is within a threshold range of a frequency of the resonator.

* * * * *